United States Patent [19]

Goto

[11] Patent Number: 4,591,715
[45] Date of Patent: May 27, 1986

[54] LIGHT GUIDE MEMBER FOR RADIATION IMAGE READ-OUT

[75] Inventor: Chiaki Goto, Kanagawa, Japan

[73] Assignee: Fuji Photo Film Co., Ltd., Minami-ashigara, Japan

[21] Appl. No.: 711,093

[22] Filed: Mar. 13, 1985

[30] Foreign Application Priority Data

Mar. 15, 1984 [JP] Japan .................................. 59-50024

[51] Int. Cl.$^4$ .............................................. G02B 6/00
[52] U.S. Cl. .................................. 250/327.2; 250/227; 250/484.1; 358/200
[58] Field of Search .................. 250/327.2, 484.1, 227; 350/172, 171, 170; 358/75, 199, 200

[56] References Cited

U.S. PATENT DOCUMENTS

| | | | |
|---|---|---|---|
| 4,258,264 | 3/1981 | Kotera et al. | 250/484.1 |
| 4,315,318 | 2/1982 | Kato et al. | 364/515 |
| 4,346,295 | 8/1982 | Tanaka et al. | 250/327.2 |
| 4,485,302 | 11/1984 | Tanaka et al. | 250/327.2 |
| 4,495,412 | 1/1985 | Thoone et al. | 250/227 |

*Primary Examiner*—Alfred E. Smith
*Assistant Examiner*—Constantine Hannaher
*Attorney, Agent, or Firm*—Gerald J. Ferguson, Jr.

[57] ABSTRACT

A light guide member comprises an optical block provided with a light input face positioned close to and approximately in parallel with a stimulable phosphor sheet carrying a radiation image stored therein, and a dichroic optical plane formed above the light input face at an angle larger than 45° with respect to the light input face. The dichroic optical plane transmits stimulating rays and reflects light emitted by the stimulable phosphor sheet upon exposure to stimulating rays. The optical block is also provided with upper and lower total reflection planes extending approximately in parallel with the path of light reflected by the dichroic optical plane after entering from the light input face approximately normal thereto.

9 Claims, 7 Drawing Figures

LIGHT GUIDE MEMBER FOR RADIATION IMAGE READ-OUT

BACKGROUND OF THE INVENTION

1. Field of the Invention

This invention relates to a light guide member for guiding light emitted by a stimulable phosphor sheet to a photodetector during the image read-out step in a radiation image recording and reproducing system wherein the stimulable phosphor sheet is exposed to a radiation passing through an object to have a radiation image stored therein, the stimulable phosphor sheet carrying the radiation image stored therein is scanned by stimulating rays which cause it to emit light in proportion to the radiation energy stored, the emitted light is photoelectrically detected and converted to an electric image signal, and a visible image is reproduced by use of the electric image signal.

2. Description of the Prior Art

The radiation image recording and reproducing system as described above is disclosed, for example, in U.S. Pat. Nos. 4,258,264 and 4,315,318, and Japanese Unexamined Patent Publication No. 56(1981)-11395. The radiation image recording and reproducing system was also described in "Nikkan Kogyo Shinbun" (Daily Industrial Newspaper), June 23, 1981 edition, page 16. The light guide member used for image read-out in the radiation image recording and reproducing system is disclosed, for example, in U.S. Pat. No. 4,346,295.

In order to improve the light guiding efficiency of the light guide member and to realize efficient image read-out with a small apparatus, the applicant proposed a novel light guide member provided with a dichroic optical plane in Japanese patent application No. 58(1983)-218678. However, a need exists for a light guide member further improved in design. FIGS. 1 and 2 are sectional side views showing embodiments of the light guide member described in Japanese patent application No. 58(1983)-218678, and FIG. 3 is an enlarged view of FIG. 1. In the embodiments of FIGS. 1 and 2, stimulating rays entering the light guide member in the direction as indicated by the arrow A cause the stimulable phosphor sheet to emit light in the directions as indicated by the arrows B1, B2 and C. The light emitted in the directions as indicated by the arrows B1 and B2 are reflected efficiently and guided inside of the light guide member. However, the light emitted in the direction as indicated by the arrow C comes out of the upper surface of a block 1. The light guide member as shown in FIG. 1 is advantageous over the light guide member as shown in FIG. 2 in that a photodetector such as a photomultiplier can be easily connected to the end portion of the block 1. On the other hand, the latter is advantageous over the former in that the height of the apparatus can be made small and the size of the whole apparatus can be decreased.

Further, as shown in FIG. 3, the embodiment of FIG. 1 is disadvantageous in that some components of the light emitted by the stimulable phosphor sheet come out of the light guide member as indicated by the arrows D and E. Thus it is desired to further improve the light guiding efficiency.

SUMMARY OF THE INVENTION

The primary object of the present invention is to provide a light guide member exhibiting an improved light guiding efficiency by preventing the light emitted by a stimulable phosphor sheet from escaping from the light guide member.

Another object of the present invention is to provide a light guide member which minimizes the height of the apparatus and which can be easily connected to a photodetector.

The light guide member for radiation image read-out in accordance with the present invention comprises an optical block having a light input face standing face to face with a stimulable phosphor sheet. The optical block is provided with the light input face positioned close to and approximately in parallel with the stimulable phosphor sheet to stand face to face therewith, a dichroic optical plane (an optical plane transmitting the stimulating rays therethrough and reflecting the light emitted by the stimulable phosphor sheet) formed above the light input face at an angle larger than 45° with respect to the light input face, and upper and lower total reflection planes extending approximately in parallel with the path of light reflected by the dichroic optical plane after entering from the light input face approximately normal thereto.

In the present invention, since the light input face of the light guide member is positioned close to and in parallel with the stimulable phosphor sheet to stand face to face therewith, it is possible to obtain a large light receiving angle. Further, since the stimulating rays passing through the dichroic optical plane impinge upon the stimulable phosphor sheet from the inner side of the light input face, it is possible to receive the light component having the highest intensity among the components of the light emitted by the stimulable phosphor sheet, thereby improving the light guiding efficiency. Also, since the light reflected by the dichroic optical plane impinges upon the upper and lower total reflection planes at a large angle of incidence, the light is totally reflected and does not come out of the upper and lower total reflection planes. Since the upper total reflection plane is inclined obliquely with respect to the horizontal plane, even when the light entering from the light input face directly impinges upon the upper total reflection plane, the light is efficiently reflected thereby and guided inside of the light guide member. Also, since the upper and lower total reflection planes extend upward obliquely, the light output face of the light guide member is positioned above and away from the stimulable phosphor sheet, and it becomes easy to connect a photodetector to the light output face.

DESCRIPTION OF THE PREFERRED EMBODIMENTS

The present invention will hereinbelow be described in further detail with reference to FIGS. 4 to 7 of the accompanying drawings.

Figure 1:
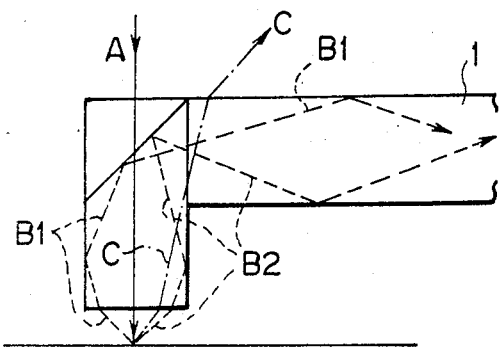
FIGS. 1 and 2 are side sectional views examples of the conventional light guide member used for radiation image read-out.
Figure 2:
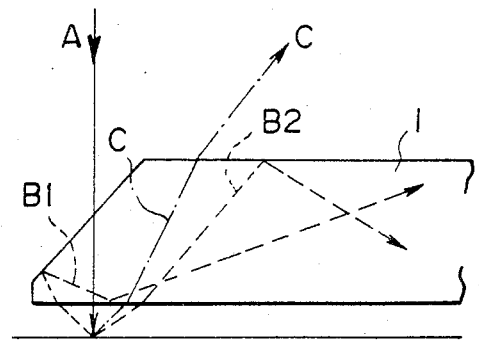
Figure 3:
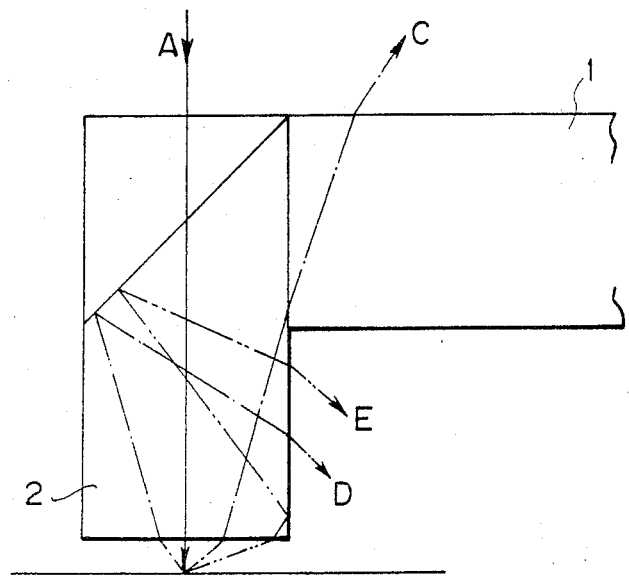
FIG. 3 is an enlarged view of FIG. 1.
Figure 4:
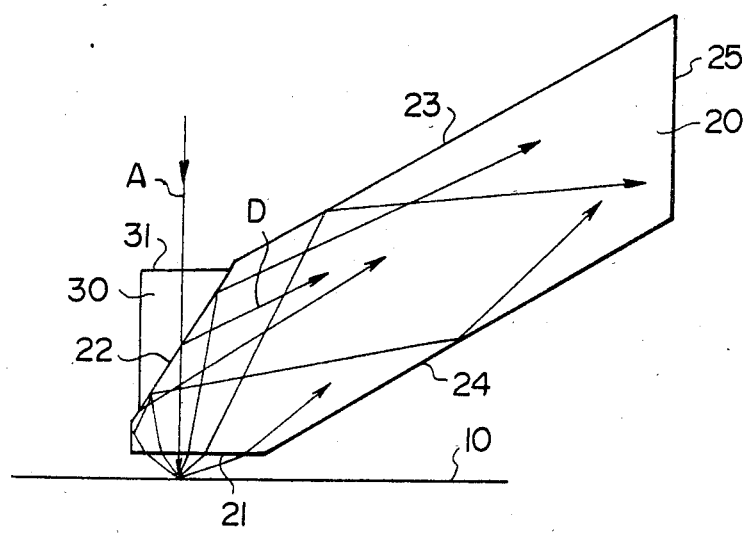
FIG. 4 is a side sectional view showing an embodiment of the light guide member in accordance with the present invention.

Referring to FIG. 4, the light guide member in accordance with the present invention comprises an optical block 20. The optical block 20 is provided with a light input face 21 positioned close to and approximately in parallel with a stimulable phosphor sheet 10 to stand face to face therewith, and a dichroic optical plane 22 (a dichroic optical plane transmitting the stimulating rays A impinging thereupon from above and reflecting the light emitted by the stimulable phosphor sheet 10 when it is exposed to the stimulating rays A) formed above the light input face 21 at an angle larger than 45° with respect to the light input face 21. The optical block 20 is also provided with an upper total reflection plane 23 extending upward obliquely from the upper end of the dichroic optical plane 22 approximately in parallel with the path of light D reflected by the dichroic optical plane 22 after entering from the light face 21 approximately normal thereto, and a lower total reflection plane 24 extending upward obliquely and approximately in parallel with the upper total reflection plane 23 from the end of the light input face 21 farther from the dichroic optical plane 22. The optical block 20 receives the light emitted by the stimulable phosphor sheet 10 when it is exposed to the stimulating rays A, and efficiently guides the light to a photodetector, such as a photomultiplier, connected directly or indirectly to a light output face 25 of the optical block 20. The photodetector is designated by 50A to 50D in FIG. 5, and by 50 in FIG. 6.

In the embodiment of FIG. 4, a triangular prism block 30 having a stimulating ray input face 31 normal to the stimulating rays A is closely contacted with the outer surface of the dichroic optical plane 22, so that the stimulating rays A efficiently impinge upon the stimulable phosphor sheet 10.

In the light guide member fabricated as described above, the stimulating rays A can pass through the dichroic optical plane 22 and impinge upon the stimulable phosphor sheet 10 normal thereto from inside the light input face 21. (The stimulating rays A need not necessarily impinge normal to the stimulable phosphor sheet 10. For example, the triangular prism block 30 may be omitted, and the stimulating rays A may impinge upon the dichroic optical plane 22 approximately normal thereto.) Therefore, the light emitted by the stimulable phosphor sheet 10 when it is exposed to the stimulating rays A is received from the light input face 21 at a large light receiving angle. As clear from FIG. 4, the light entering the light input face 21 in any direction impinges upon the upper and lower total reflection planes 23 and 24 at such an angle that the light is totally reflected by the planes 23 and 24. Therefore, the light is guided very efficiently to the light output face 25.

Figure 5:
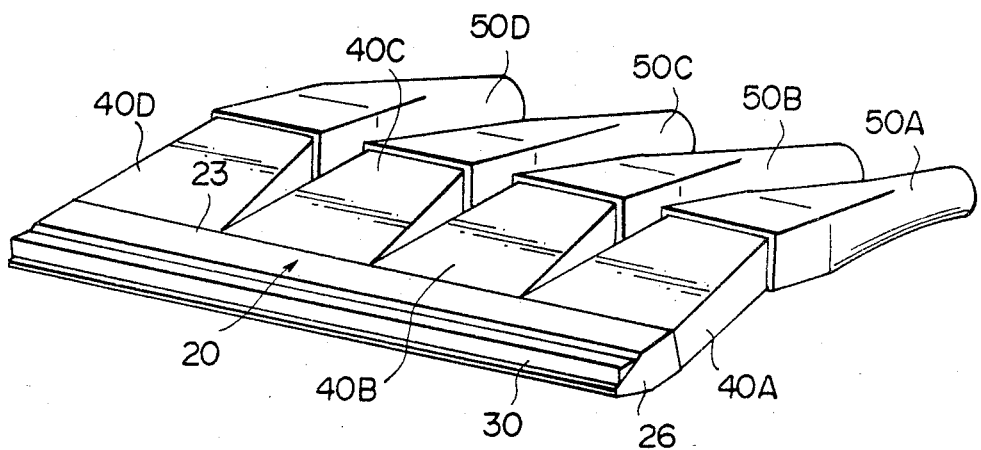
FIGS. 5 and 6 are perspective views showing the light guide member of FIG. 4 used together with a photodetector.

In FIG. 5, the optical block 20 is extended in the width direction of the stimulable phosphor sheet 10, and the light output face 25 is optically connected to light guiding blocks 40A, 40B, 40C and 40D. The light output ends of the blocks 40A to 40D are closely contacted with photomultipliers 50A, 50B, 50C and 50D.

Figure 6:
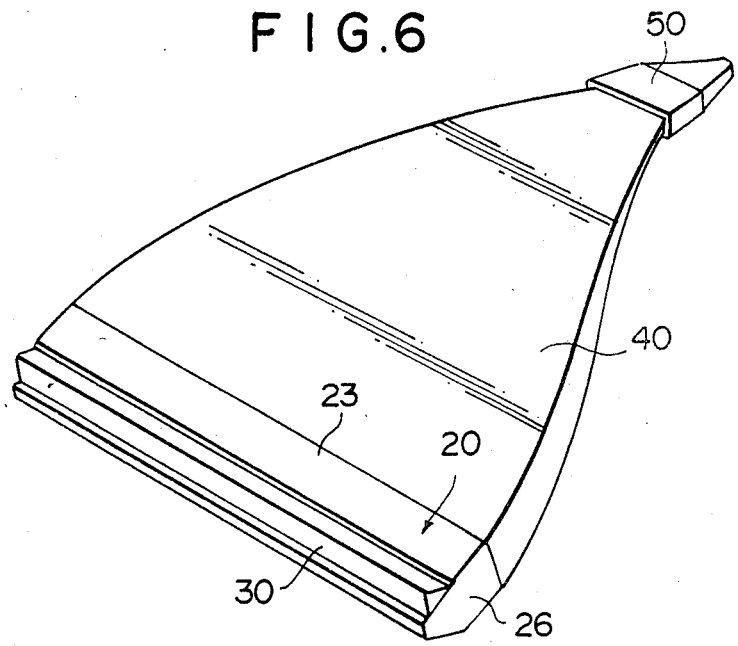

In FIG. 6, a single light guiding block 40 is optically connected to the light output face 25 of the optical block 20 of FIG. 5, and a photomultiplier 50 is closely contacted with the light output end of the light guiding block 40.

The light guiding blocks 40A to 40D in FIG. 5 and the light guiding block 40 in FIG. 6 are prism blocks having the upper, lower, right and left faces constituted by total reflection planes, or prism blocks having the upper and lower faces constituted by total reflection planes, and the right and left faces provided with reflection films.

The right and left end faces of the block 20 (only one of which is designated by the reference numeral 26 in FIGS. 5 and 6) should preferably be constituted by total reflection planes approximately normal to the stimulable phosphor sheet 10. Of course, the right and left end faces should at least be free from uneven portions readily allowing the light to leak outwardly.

In order to facilitate separation from the light emitted by the stimulable phosphor sheet 10 upon stimulation thereof, the wavelength distribution of the stimulating rays should be different from and far apart from the wavelength distribution of the light emitted by the stimulable phosphor sheet 10. Namely, the spectrum of the stimulating rays should not overlap the spectrum of the light emitted by the stimulable phosphor sheet 10. Accordingly, the stimulating rays should preferably be a He-Ne laser beam (633 nm), a YAG laser beam (1064 nm), a ruby laser beam (694 nm), a semiconductor laser beam (infrared rays), or the like, which has a wavelength longer than that of the light emitted by the stimulable phosphor sheet 10.

Figure 7:
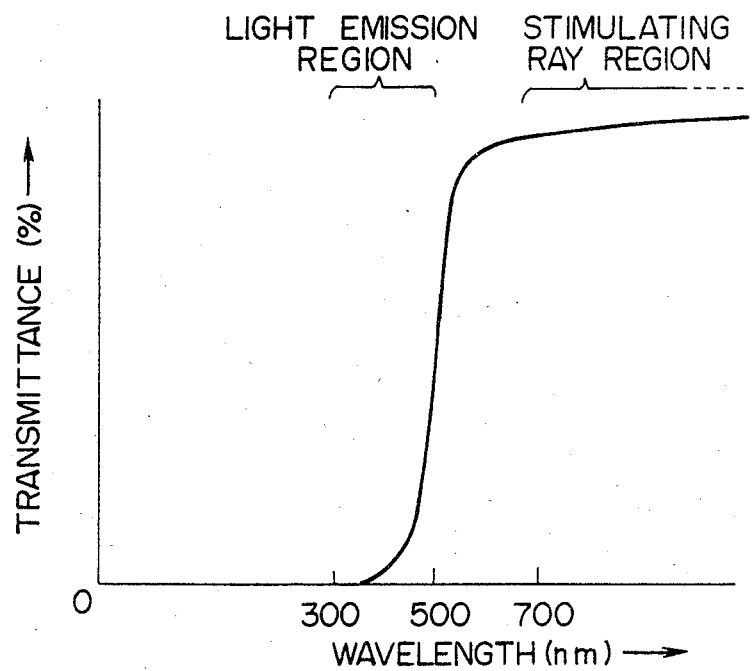
FIG. 7 is a graph showing the spectral transmittance of the dichroic optical plane used in the present invention.

Therefore, the dichroic optical plane 22 should exhibit the spectral transmittance as shown in FIG. 7 (when the angle of incidence is 45°). That is, it should transmit the stimulating rays A having a long wavelength, and reflects the light having a short wavelength (e.g. 300 nm to 500 nm) emitted by the stimulable phosphor sheet 10. Such a dichroic optical plane is fabricated, for example, of a plurality of layers of films of a high refractive index material and a low refractive index material. When the triangular prism block 30 is closely contacted with the dichroic optical plane 22, the block 30 is optically joined with the multi-layer optical plane.

I claim:

1. A light guide member for radiation image readout, which comprises an optical block provided with:
    (i) a light input face positioned close to and approximately in parallel with a stimulable phosphor sheet carrying a radiation image stored therein to stand face to face with said stimulable phosphor sheet,
    (ii) a dichroic optical plane formed above said light input face at an angle larger that 45° with respect to said light input face, said dichroic optical plane transmitting stimulating rays and reflecting light emitted by said stimulable phosphor sheet upon exposure to said stimulating rays,
    (iii) an upper total reflection plane extending upward obliquely from an upper end of said dichroic optical plane approximately in parallel with the path of light reflected by said dichroic optical plane after entering from said light input face approximately normal thereto, and
    (iv) a lower total reflection plane extending upward obliquely and approximately in parallel with said upper total reflection plane from an end of said light input face farther from said dichroic optical plane.

2. A light guide member as defined in claim 1 wherein the outer surface of said dichroic optical plane is closely contacted with a triangular prism block having a stimulating ray input face normal to said stimulating rays.

3. A light guide member as defined in claim 1 wherein said optical block extends in the width direction of said stimulable phosphor sheet, and a light output face of said optical block is optically connected to a plurality of light guiding blocks having light output ends connected to photodetectors.

4. A light guide member as defined in claim 3 wherein said light guiding blocks are prism blocks having total reflection planes at the upper, lower, right and left faces.

5. A light guide member as defined in claim 3 wherein said light guiding blocks are prism blocks having total reflection planes at the upper and lower faces, and reflection films at the right and left faces.

6. A light guide member as defined in claim 1 wherein said optical block extends in the width direction of said stimulable phosphor sheet, and a light output face of said optical block is optically connected to a single light guiding block having a light output end connected to a single photodetector.

7. A light guide member as defined in claim 6 wherein said light guiding block is a prism block having total reflection planes at the upper, lower, right and left faces.

8. A light guide member as defined in claim 6 wherein said light guiding block is a prism block having total reflection planes at the upper and lower faces, and reflection films at the right and left faces.

9. A light guide member as defined in any of claims 1 to 8 wherein right and left faces of said optical block are constituted by total reflection planes approximately normal to said stimulable phosphor sheet.

* * * * *